United States Patent
Godwin et al.

(10) Patent No.: US 7,819,390 B2
(45) Date of Patent: Oct. 26, 2010

(54) FENCE CLIP

(76) Inventors: Aaron Godwin, 440 Mallard Rd., Hatboro, PA (US) 19040; Bruce Schwartz, 1115 Jefferson La., Huntington Valley, PA (US) 19006

( * ) Notice: Subject to any disclaimer, the term of this patent is extended or adjusted under 35 U.S.C. 154(b) by 0 days.

(21) Appl. No.: 12/051,500

(22) Filed: Mar. 19, 2008

(65) Prior Publication Data
US 2009/0238640 A1 Sep. 24, 2009

(51) Int. Cl.
B21F 27/00 (2006.01)
E04H 17/16 (2006.01)

(52) U.S. Cl. .......................... 256/22; 256/65.2; 256/59; 403/397; 24/458; 267/160

(58) Field of Classification Search .................. 256/22, 256/59, 65.02, 65.11, 65.12, 68, 70; 403/329, 403/388, 396, 397, 400
See application file for complete search history.

(56) References Cited

U.S. PATENT DOCUMENTS

| | | | | |
|---|---|---|---|---|
| 2,520,725 A * | 8/1950 | Judd | ........................... | 248/27.1 |
| 2,634,473 A * | 4/1953 | Price | ........................ | 248/298.1 |
| 3,529,808 A * | 9/1970 | Siebers | ..................... | 256/65.08 |
| 3,675,958 A * | 7/1972 | Duffy | ........................... | 411/523 |
| 4,014,520 A | 3/1977 | Walters | | |
| 4,360,285 A * | 11/1982 | Magness | ..................... | 403/187 |
| 4,369,953 A * | 1/1983 | Greiner et al. | ................. | 256/24 |
| 5,060,777 A * | 10/1991 | Van Horn et al. | ........... | 194/317 |
| 5,161,783 A * | 11/1992 | German | ........................ | 256/19 |
| 5,387,048 A * | 2/1995 | Kuo | ......................... | 403/109.3 |
| 5,581,262 A * | 12/1996 | Kawahata et al. | ...... | 343/700 MS |
| 5,660,378 A * | 8/1997 | Schall | ....................... | 256/65.12 |
| 5,873,564 A * | 2/1999 | Bisch | ....................... | 256/65.12 |
| 6,003,261 A * | 12/1999 | French | ............................ | 43/1 |
| 6,343,890 B1* | 2/2002 | Benson | ....................... | 403/329 |
| 6,444,952 B2* | 9/2002 | Ballem et al. | ................ | 219/205 |
| 6,499,725 B2* | 12/2002 | Meis et al. | ................ | 256/65.03 |
| 6,631,887 B1* | 10/2003 | Walmsley | ..................... | 256/22 |
| 6,752,386 B1* | 6/2004 | Bundy | ....................... | 256/65.12 |
| 6,772,998 B2* | 8/2004 | Bebendorf | .................... | 256/24 |
| 6,874,721 B2* | 4/2005 | Aaron et al. | .............. | 242/348.2 |
| 7,021,607 B1* | 4/2006 | Alexander | ................ | 256/65.11 |
| D526,743 S * | 8/2006 | Battista et al. | ............. | D27/161 |
| 7,134,647 B2* | 11/2006 | Graber | .................... | 256/65.02 |
| 7,182,713 B2* | 2/2007 | Wang et al. | .................... | 482/35 |
| 7,232,114 B2* | 6/2007 | Platt | ......................... | 256/65.04 |
| 7,347,412 B1* | 3/2008 | Zhu | ............................ | 256/22 |
| 7,360,754 B2* | 4/2008 | Robbins | .................. | 256/65.12 |

* cited by examiner

*Primary Examiner*—Michael P Ferguson
*Assistant Examiner*—Nahid Amiri
(74) *Attorney, Agent, or Firm*—Volpe and Koenig, P.C.

(57) ABSTRACT

A clip used to attach vertical and horizontal members of a fencing assembly is provided. The clip includes three resilient legs and enables fencing assemblies to be constructed on site without the use of screws or welding. Configurations for vertical and horizontal members of a fencing assembly that can be used in conjunction with the clip. Methods of assembly are provided as well.

17 Claims, 8 Drawing Sheets

FIG. 17

FENCE CLIP

FIELD OF INVENTION

This invention relates to fencing systems. In particular, the invention relates to a clip for attaching the horizontal and vertical members used in a metal fence assembly without the use of screws or welding.

BACKGROUND

Picket fences are constructed by connecting vertical members for support to horizontal members for stability. The members of metal fences are generally screwed or welded together off site and supplied in pre-fabricated form. As a result, installation and transport can be both difficult and time consuming.

In one known solution, a clip, having two retractable arms is secured to the vertical member either by placing a retention element into the top open end of the picket, or by inserting the clip in flat form through two complimentary slits in the vertical member, then bending the clip so as to create two retractable arms. The horizontal member is outfitted with a hole for receiving the vertical member, which is slid into place through the hole. Once the horizontal member is in place over the clip, the retractable arms hold it securely on the vertical member.

In another known solution, a railing assembly is created using parallel top and bottom rails supporting an array of parallel vertical pickets or spindles. Both top and bottom rails have grooves through which locking plates are engaged. The locking plates have holes fitted for the vertical members and are used to hold them in place.

The known solutions are problematic in that they do not provide the desired flexibility of design, ease of assembly or ease of transport.

SUMMARY

The present invention concerns a clip for assembling a fence without the use of screws or welding.

The preferred clip comprises two resilient legs, arranged so that they are connected by a curved segment at their uppermost points, essentially forming an "n" shape. A resilient arm extends outward in a cantilevered fashion from a location on one of the two vertical legs.

Each horizontal member of a fencing assembly employing the clip has a cross section that is essentially an inverted box with apertures through which the vertical members may be inserted during assembly.

Each vertical member of a fencing assembly employing the clip is hollow, rectangular in cross section, and has slots for insertion of the resilient arm of the clip at the locations where intersection with the horizontal members is to occur.

To construct a fencing assembly employing the preferred clip, the resilient arm of the clip is inserted into the slot of the vertical member so that the resilient legs sit flat against the vertical member. The vertical member is inserted through the aperture of the horizontal member. The horizontal member is then slid over the clip attached to the vertical member, engaging the clip, and holding the horizontal member in place upon the vertical member.

DETAILED DESCRIPTION OF THE PREFERRED EMBODIMENT

The invention will be described with reference to the drawing figures wherein a like numeral refers to the same structure in each figure.

Figure 1:
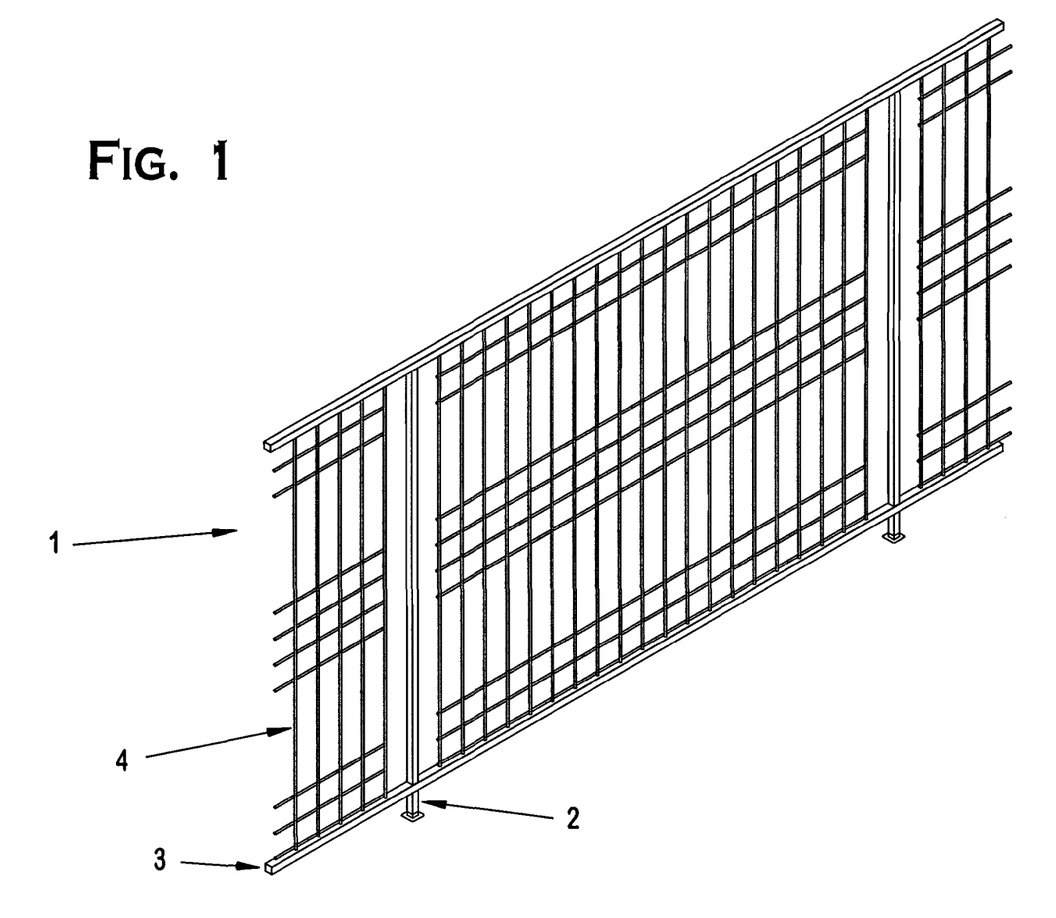
FIG. 1 is a perspective view a picket fence having vertical pickets and horizontal rails.

FIG. 1 shows a section of a completed fence structure. The fence 1 has vertical posts 2 and horizontal rails 3 that define enclosed areas of vertical pickets 4. The pickets 4 and horizontal rails 3 are generally provided as sub-assemblies that are connected on site with the vertical posts 2.

Use of the clip according to the preferred embodiment will be detailed with reference to FIGS. 2 and 3. The vertical pickets 4 generally, but not necessarily, are square with perpendicular sides 9 that have a predetermined dimension "D." The horizontal rails 3 have an inverted box shape having sides 10 that depend from planar top or bridge 16 which defines an aperture 18 for receipt of the vertical picket 4. Between the inside walls 11 of depending walls 10 and lips 12, there is a groove 14. The lips 12 are spaced apart by at least the dimension "W" so that the post 2 will fit between them. At least one side 9 of the post 2 includes a defined slot 20. The slot 20 is dimensioned to receive a portion of the clip 40.

The clip 40 has a body portion 42 that is generally "n" shaped with diverging legs 44 and 46 that are connected at an arc 48 and spaced apart terminal feet 50. As shown in FIGS. 6-10, each of the legs 44, 46 of the preferred embodiment extends in a respective longitudinal direction D1, D2 and includes a top end 32, bottom end 34, and first and second side edges 36, 38. The top ends 32 are connected by the arc 48 and the feet 50 extend from the bottom ends 34. The legs are bendable inward at an angle between 20 and 50 degrees. One of the legs 46 may be shorter than the other leg 44. The feet 50 are spaced apart by at least the same dimension as the inside walls 11 with a more vertical orientation to a plan beneath the clip 40. The feet of the preferred embodiment extend inward with respect to the body portion 42 and terminate at points located between the legs 44, 46 with respect to a plane extending beneath the clip 40. The feet 50 are sized for an interference fit within the inside of the horizontal rail 3 so that they will not pass beyond the lips 12 if the structure is dislodged or jarred.

Figures 6, 7, 8:
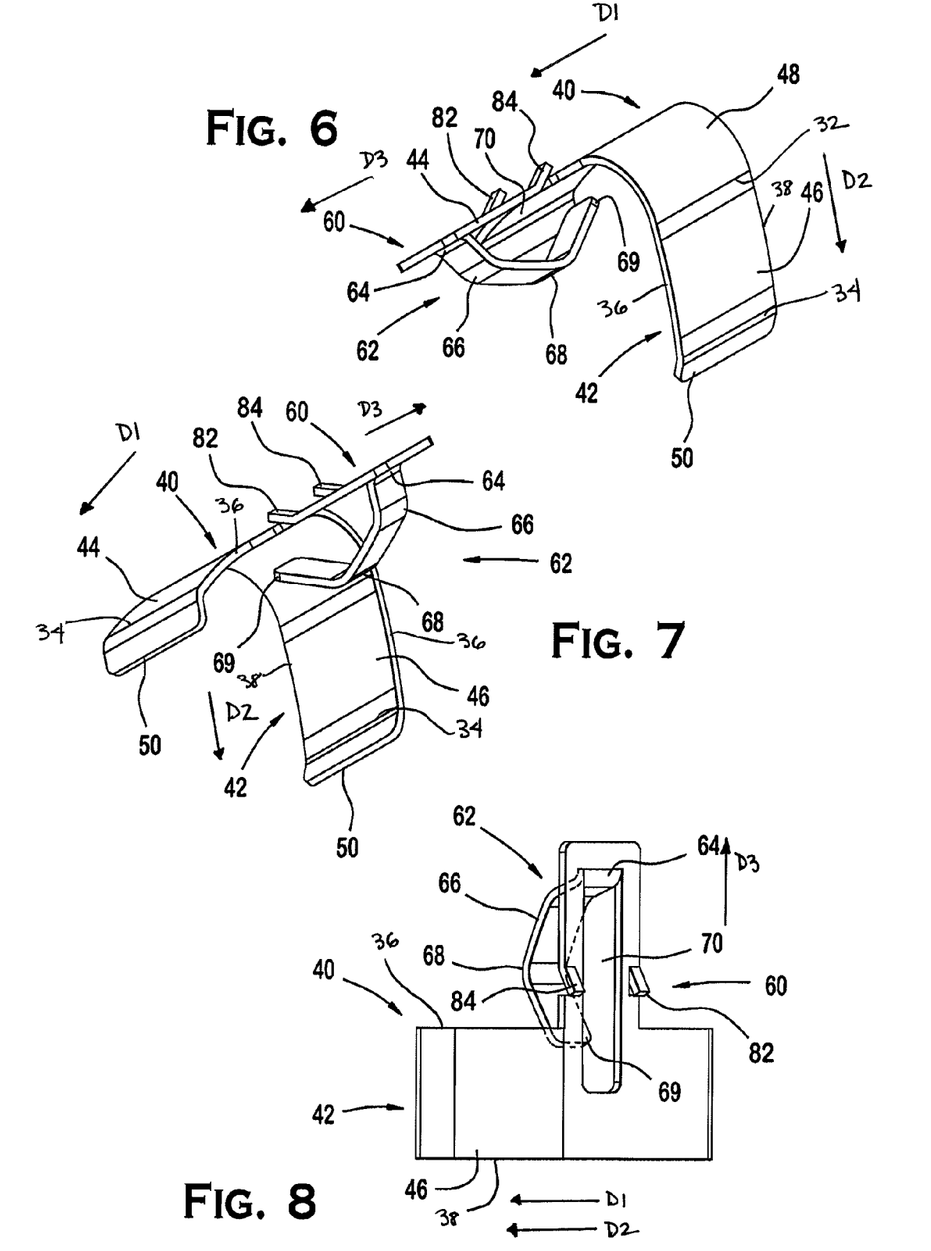
FIGS. 6 through 10 are a series of perspective views of the preferred clip as it appears from the various perspectives.
Figure 9:
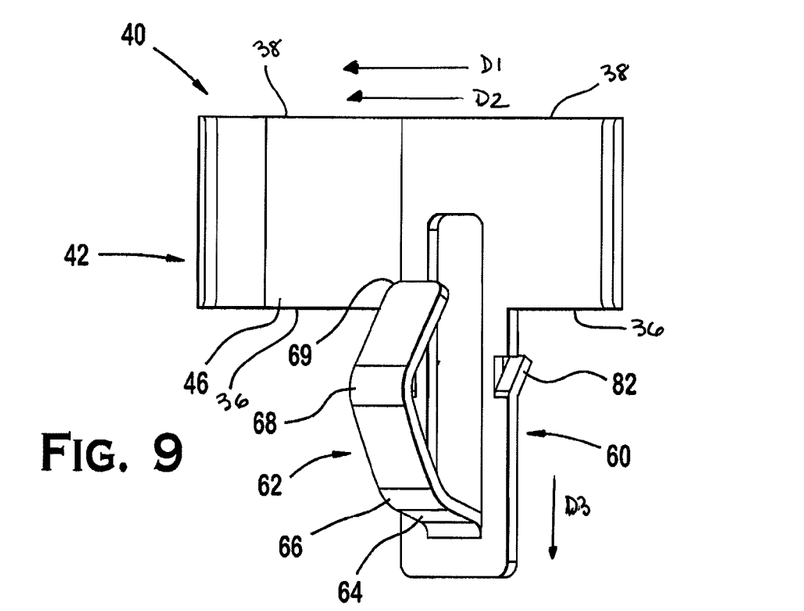
Figure 10:
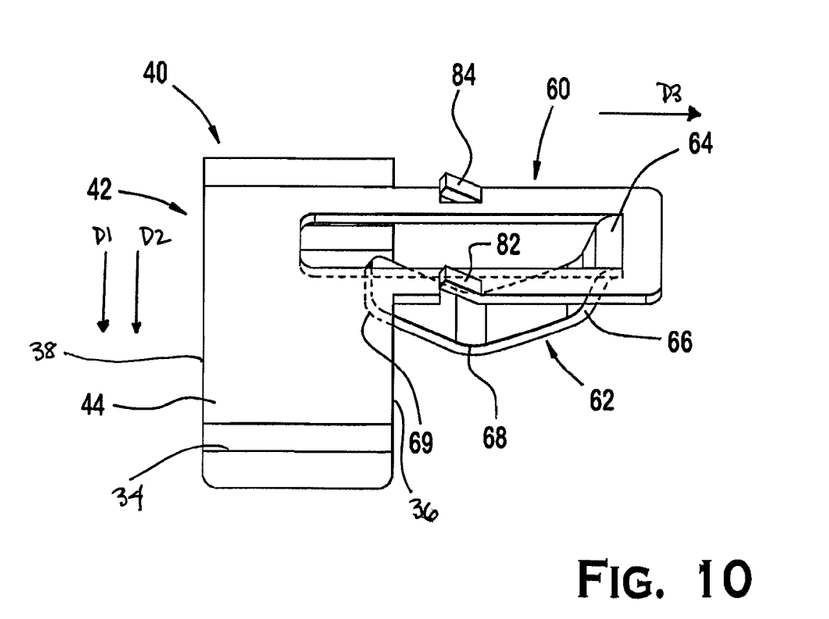

With reference to FIGS. 6, 7 and 8, the structure of preferred clip 40 will be described in more detail. The body portion 42 is arched to connect legs 44 and 46, of which leg 44 is the longer. Each of the legs 44 and 46 has a foot 50 that is formed inwardly so as to be somewhat perpendicular to a plane beneath the clip 40 and parallel to each other. One of the legs 44 supports an arm like extension 60 that extends from side edge 36 of the leg 44. The arm 60 extends in a direction D3 perpendicular to and transverse with respect to the first longitudinal direction D1 and is coplanar with at least a portion of the leg 44. In the preferred embodiment, a finger 62 is stuck from the center of the arm 60 and a portion of the leg 44, to produce a slot 70. See FIG. 8. As can be seen from FIGS. 6 and 7, the finger 62 is connected to the arm 60 by the joint 64 and extends from the arm 60 back towards leg 46. The finger 62 includes a first knuckle or ramp portion 66 at a first distance from the arm 60, a second knuckle 68 at a second greater distance from the arm 60, and a tip 69 which is at a third distance from arm 60 that is less than the second distance. Thus, the finger 62 has a generally curved or arched shape to depend under the arm 60; however, the finger 62 may also be formed above the arm 60. In the preferred embodiment shown in FIGS. 6-10, first and second side digits 82 and 84 are provided on either side of the arm 60, preferably on the opposite side of the arm 60 from the finger 62, and angled away from the body portion 42.

The clip 40 is preferably stamped and formed from one sheet of spring metal, such as stainless or carbon steel, but may be made from other suitable materials. In one preferred embodiment of the clip, the total width, spanning between the outer walls of the terminal feet 50, is 0.926 inches and the height, spanning from the bottom of the terminal feet 50 to the top of the arc 48, is 0.624 inches. Each of the clip walls has a thickness of 0.024 inches. The legs 44 and 46 preferably have a width of 0.373 inches. The resilient arm 60 preferably has a length of 0.530 inches and a width of 0.370 inches, with the finger 62 having a width 0.130 inches and each of the side digits 82 and 84 having a width of 0.05 inches.

Figures 2, 3:
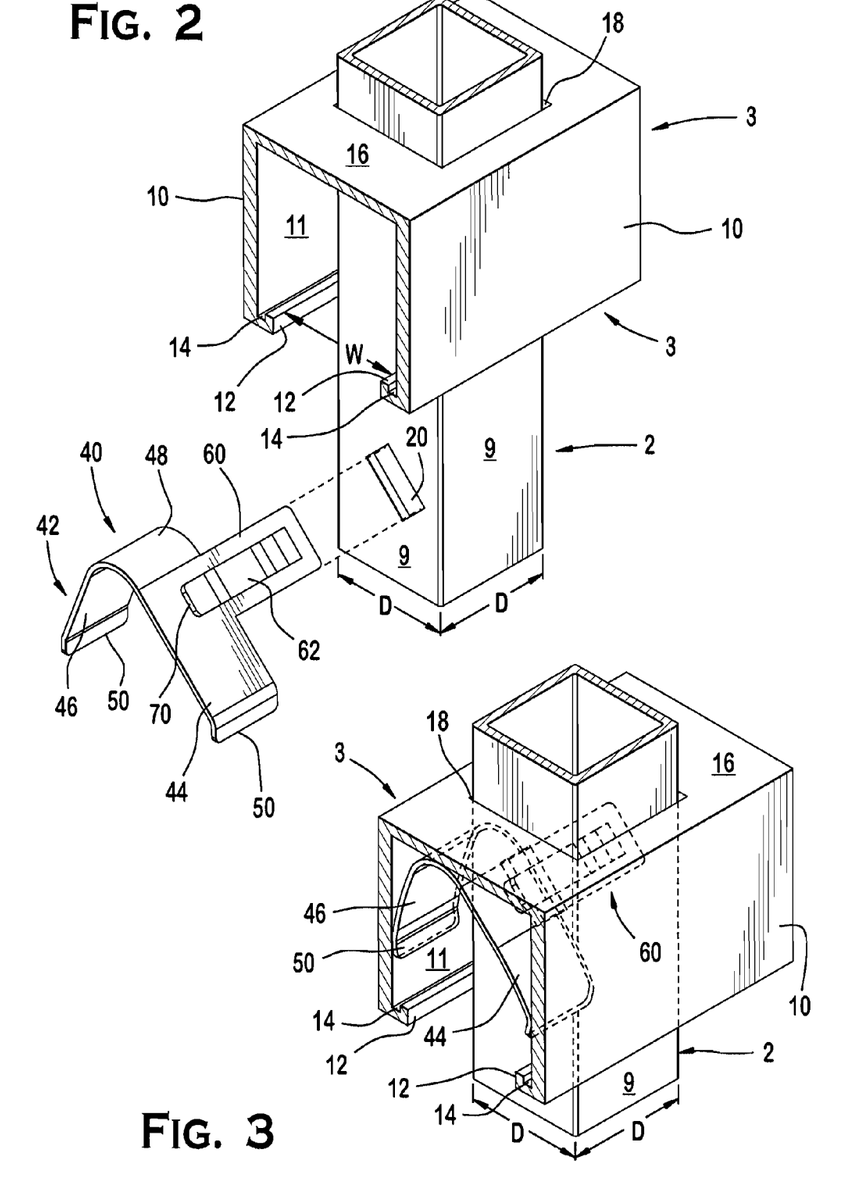
FIG. 2 is an exploded sectional view of the horizontal and vertical member with the clip prior to assembly.
FIG. 3 is a sectional view of the horizontal and vertical member with the clip positioned in the slot of the vertical member.
Figure 4:
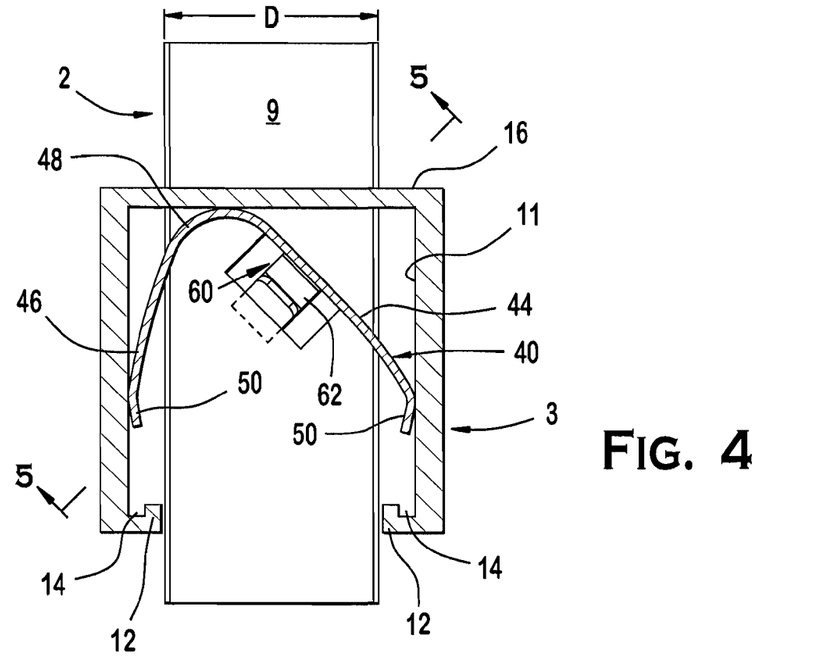
FIG. 4 is a plan view of the section of FIG. 3.
Figure 5:
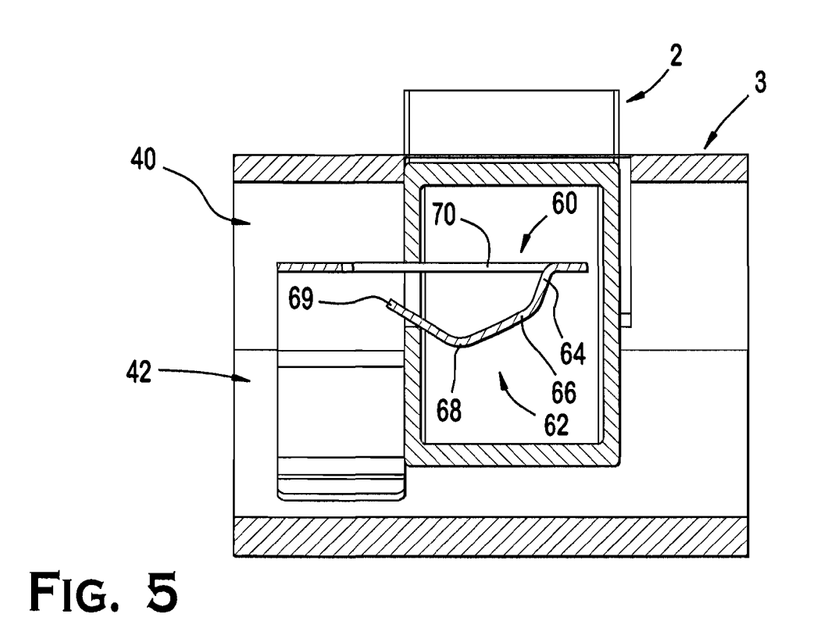
FIG. 5 is a sectional view along the line 5-5 of FIG. 4.

With reference to FIGS. 2 and 3, it can be seen that the arm 60 of clip 40 can be inserted into the slot 20. That insertion will flex the finger 62 into the slot 70, so that the finger will pass through the slot 20 and spring back within the post 2, coming into contact with side 9 defining the slot 20. As a result the finger 62 is in an interference fit within the slot 20. As can be seen from FIG. 3, legs 44 and 46 contact the interior walls 11 of the rail 3. Preferably side digits 82 and 84 are fully inserted into the slot 20 with the clip arm and abut the interior of the side 9 of the vertical member 2 to provide resistance to the clip becoming dislodged from the slot 20.

When the parts are assembled as described, the clip 40 of the preferred embodiment holds the vertical pickets 4 and horizontal rails 3 in fixed positions relative to each other. The horizontal rail 3 is positioned so that open side is facing downward. The opposite side 16 presents a solid top to the horizontal rail 3. This assembly holds the components together while hiding the clip 40 from view. Accordingly, there is no welding needed and the assembled fence does not have exposed screws or fasteners.

Figure 11:
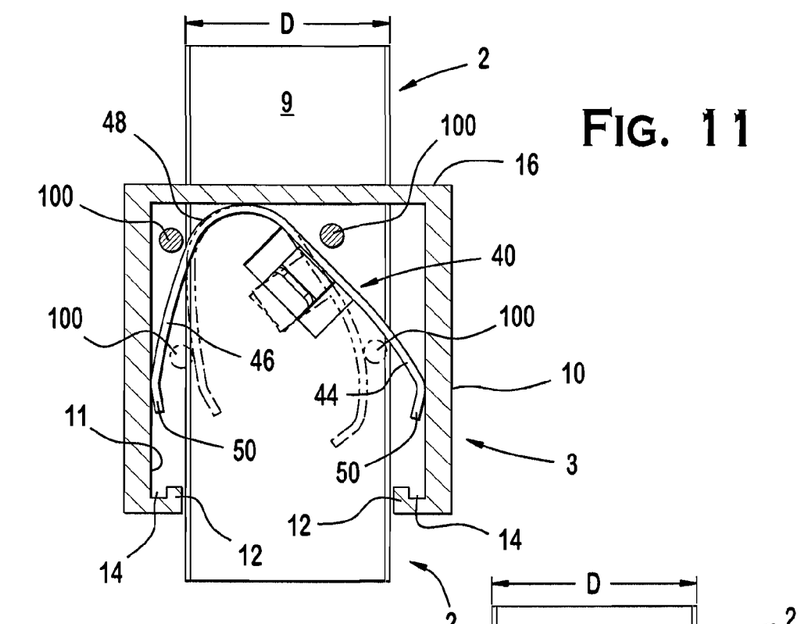
FIG. 11 is a sectional view that illustrates one possible means for removing a clip from an assembled fence.

In the event that removal of the clip 40 is desired, it may be accomplished as shown in FIGS. 11 through 14. With reference to FIG. 11, the clip 40 may be removed by using bent long nose pliers such as are available from the Vice Grip company, such as model number Irwin 2078228. As illustrated in FIG. 11, the pliers' tips 100 are place above the legs 44 and 46 and closed to bend the legs, until the legs are within the lips 12. In this case the locking pliers can be set and the horizontal rail 4 can be moved upward, or the clip 40 can be moved horizontally so that the arm 60 is freed from the post 2.

Figure 12:
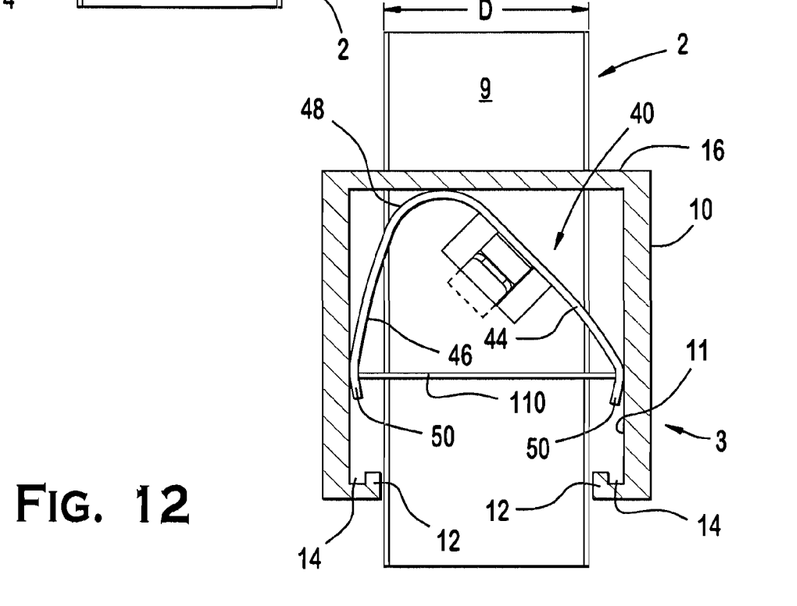
FIG. 12 is a sectional view that illustrates an alternative clip with an attached removal means.

The embodiment illustrated in FIG. 12 includes a pull line or cable 110 which may be engaged by any tool that permits a downward force so that the legs 44 and 46 are drawn to each other and within the lips 12.

Figure 13:
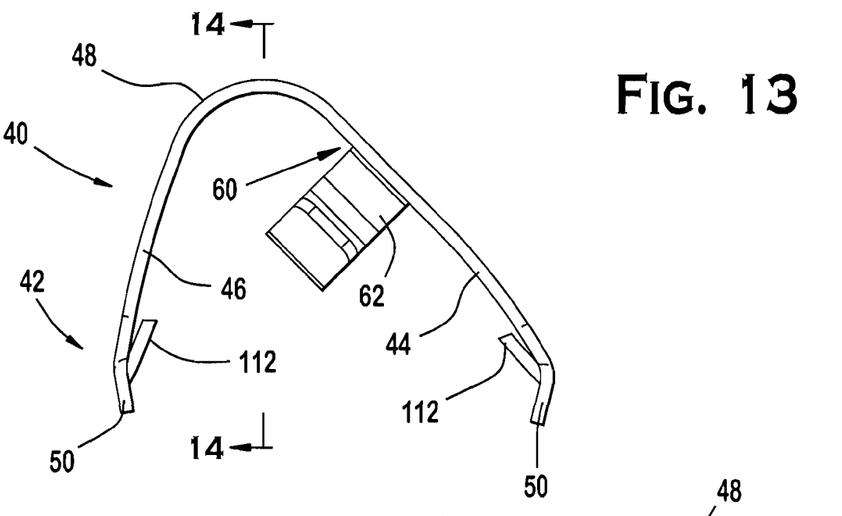
FIG. 13 is a sectional view of the clip that illustrates the attachment of a removal means.
Figures 14, 15:
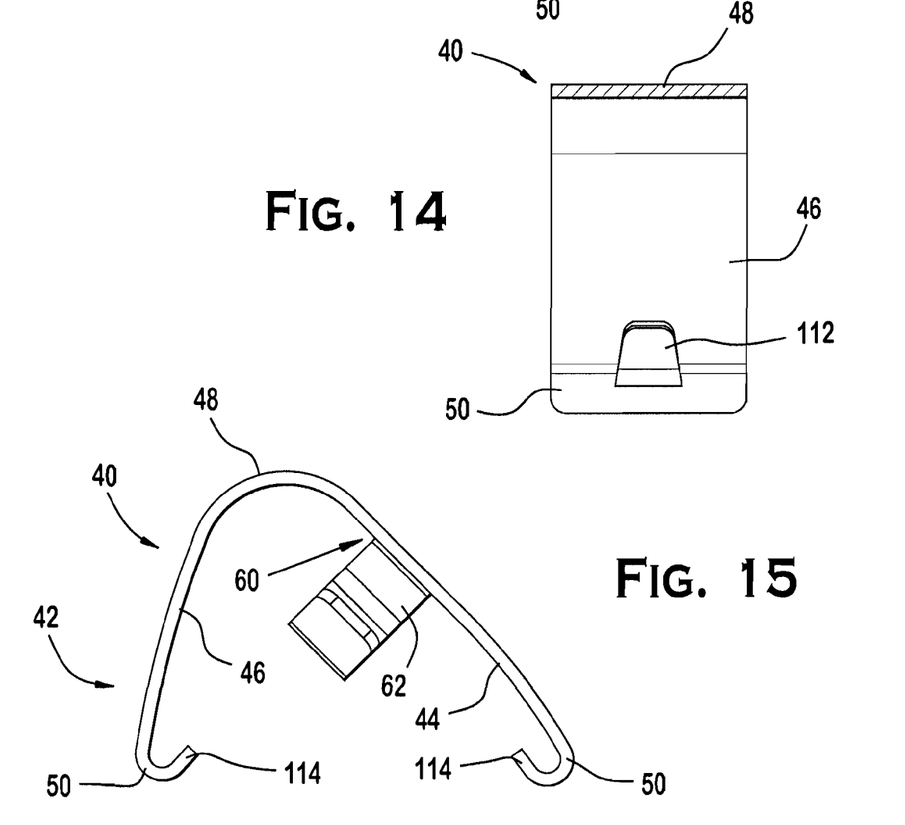
FIG. 14 is a sectional view along line 14-14 of FIG. 13.
FIG. 15 is a sectional view of the clip that illustrates an alternate attachment of a removal means.
Figure 16:
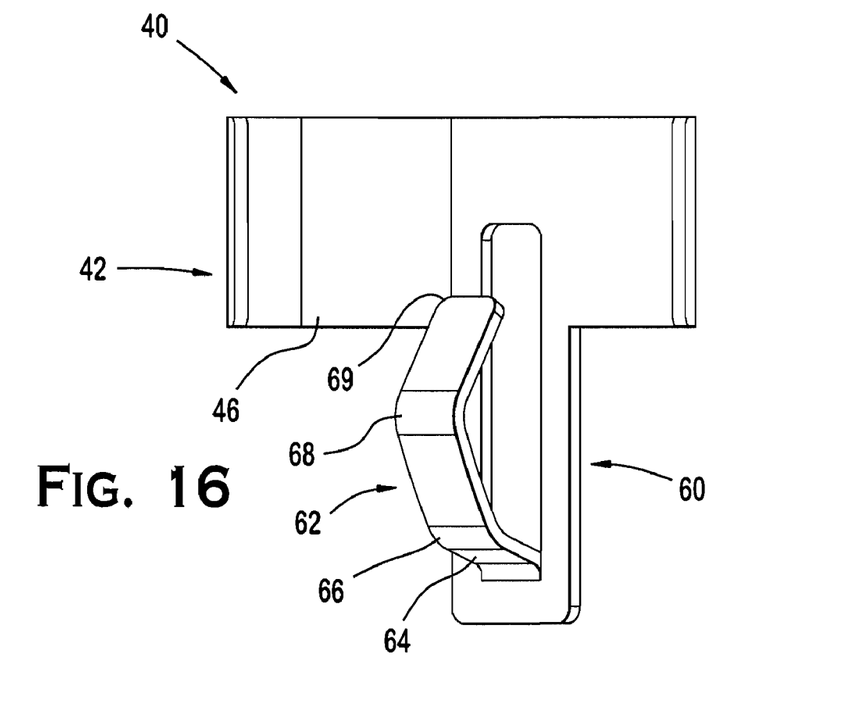
FIGS. 16 and 17 are perspective views of an alternative embodiment of the clip without side digits.
Figure 17:
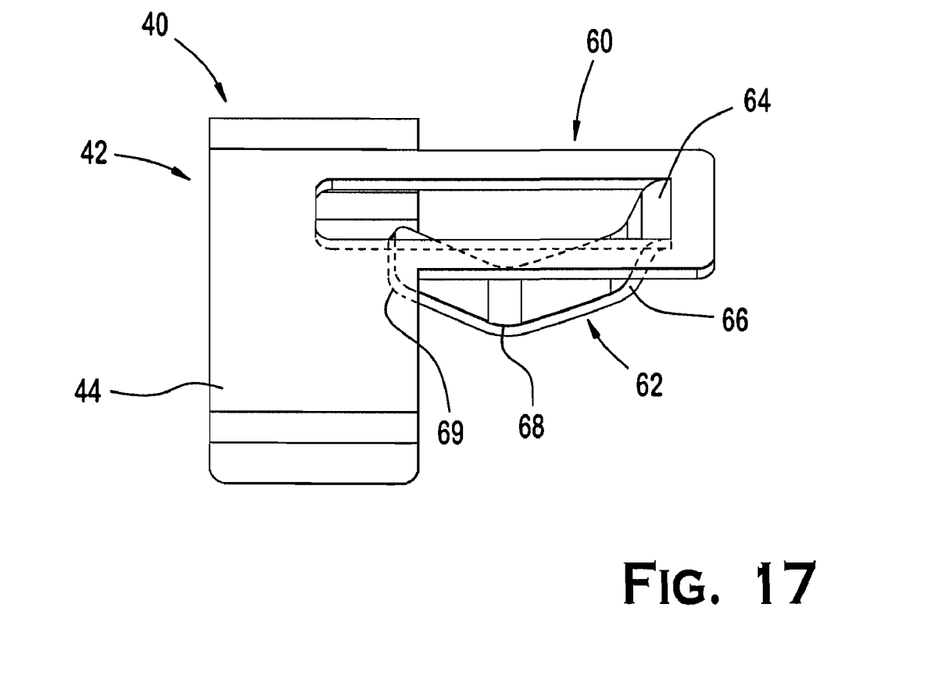

With reference to FIGS. 13 and 14, there is illustrated a configuration where the ends 50 are formed or stamped with a node 112 that is a connection point for the pull line or cable 110.

With reference to FIG. 15, there is shown a further embodiment where the feet 50 are modified with an inwardly curved portion 114 which will serve to attach the pull line or cable 112 and assist in passage beyond the lips 12.

What is claimed is:

1. A clip for connecting vertical and horizontal members in an assembly, the clip comprising:
    a generally n-shaped body portion including a first leg extending in a first longitudinal direction and a second leg extending in a second longitudinal direction, each of the first and second legs having a top end, a bottom end and first and second side edges, the top ends of the legs being connected at an arc, the bottom ends each including a terminal foot;
    an arm that extends outwardly from and is connected to one of the first or second side edges of a selected one of the first or second legs, the arm having a surface that is coplanar with at least a portion of the selected leg and extending in a direction perpendicular to and transverse with respect to the respective first or second longitudinal direction of the selected leg; and
    a curved finger extending from a side of the arm which faces inner surfaces of the first and second legs and extending towards the selected leg.

2. The clip of claim 1 wherein the legs of the n-shaped body portion each bend inwardly at an angle between 20 and 50 degrees.

3. The clip of claim 1 wherein the legs are of different lengths.

4. The clip of claim 3 wherein the shorter of the legs bends inwardly at an angle between 20 and 50 degrees.

5. The clip of claim 1, wherein each foot is formed inwardly with respect to the legs so as to be perpendicular to a plane beneath the clip and parallel to each other.

6. The clip of claim 1, further comprising a pull line connecting the terminal feet.

7. The clip of claim 6, wherein each terminal foot defines a node for attachment of the pull line.

8. The clip of claim 6, wherein each terminal foot comprises an inwardly curved portion.

9. The clip of claim 1, wherein the terminal feet each comprise outer walls, and the clip has a width spanning between the outer walls of 0.926 inches.

10. The clip of claim 1, wherein the terminal feet comprise a bottom and the arc comprises a top and the clip has a height spanning from the bottom to the top of 0.624 inches.

11. The clip of claim 1, wherein the clip comprises a wall thickness of 0.24 inches.

12. The clip of claim 1, wherein the clip is a single sheet of spring metal.

13. The clip of claim 12, wherein the metal is stainless steel.

14. The clip of claim 12, wherein the metal is carbon steel.

15. The clip of claim 1, wherein the arm further comprises first and second side digits.

16. The clip of claim 15, wherein each of the first and second digits extends away from the body and forms an angle with the arm.

17. The clip of claim 1, wherein each terminal foot extends inward with respect to the "n" shaped body portion and terminates at a respective point located between the legs with respect to a plane extending beneath the clip.

* * * * *